July 11, 1933.   V. C. DE YBARRONDO   1,917,509
APPARATUS FOR MAGNETICALLY RECORDING MOTION PICTURES
Filed March 17, 1930
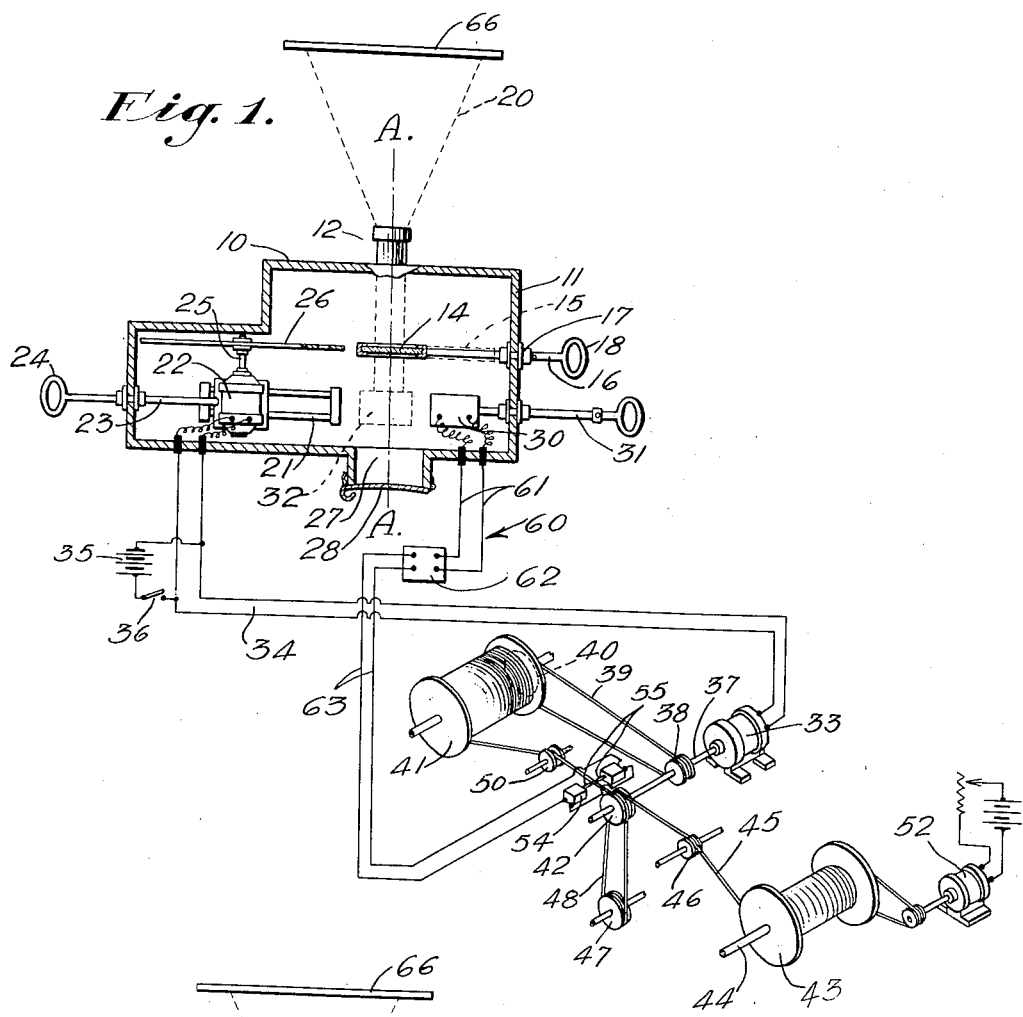
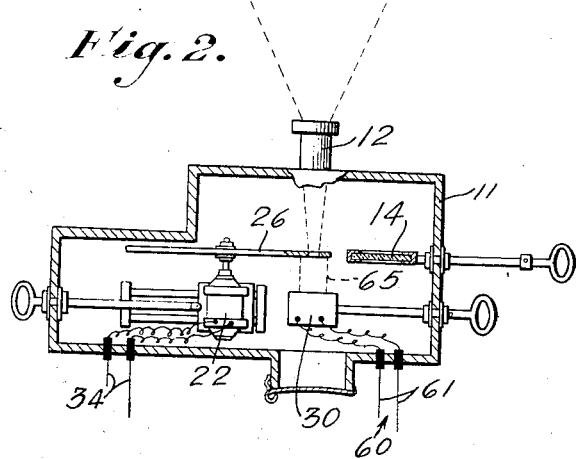
INVENTOR:
Vincent C. De Ybarrondo.
BY
ATTORNEY.

Patented July 11, 1933

1,917,509

UNITED STATES PATENT OFFICE

VINCENT C. DE YBARRONDO OF LOS ANGELES, CALIFORNIA, ASSIGNOR TO PATCO, INC., OF LOS ANGELES, CALIFORNIA, A CORPORATION OF CALIFORNIA

APPARATUS FOR MAGNETICALLY RECORDING MOTION PICTURES

Application filed March 17, 1930 Serial No. 436,420.

My invention relates to the recording of motion pictures and relates particularly to a method of and apparatus for recording and projecting motion pictures without the use of film of the character at present employed and having consecutive films with photographic images thereon. My invention comprehends the scanning of a motion picture image and the fluctuating of an electric current in accordance with the light fluctuations of the scanned image. A record representative of the fluctuations in the current is then formed, this record being available at any time for the projection of the motion picture on a screen. This projection of the motion picture is accomplished by a reversal of the recording process and consists essentially of employing the record to fluctuate an electric current, using the electric current to fluctuate a light producing means, and subsequently projecting the fluctuated light through a scanner motivated in synchronism or in timed relationship with the record.

In the simple form of the invention disclosed herein, the record of the fluctuations representative of the scanned image is of magnetic character and is shown as a wire of magnetic character on which the fluctuations are magnetically recorded. Other means of recording the motion picture may be employed, such, for instance, as a film strip on which the fluctuations are represented by fluctuations in the density or area of a silver deposit on the record strip.

Further objects and advantages of the invention will be made evident throughout the following part of the specification.

Referring to the drawing which is for illustrative purposes only,

Figure 1 is a diagrammatic view showing in simple manner an apparatus for recording a motion picture in accordance with the concept of the invention.

Fig. 2 is a diagrammatic view showing a projector which may be employed to adapt an apparatus of the character disclosed in Fig. 1 for the projection of a motion picture from the record.

In Fig. 1 I show a photographic apparatus 10 including a housing 11 having a defined focal axis represented by the line A—A. In the front of the housing 11 a lens element 12 is mounted on the focal axis A—A. Within the housing 11 is a ground glass screen 14 adapted to be moved from the operative position in which it is shown in full lines to an inoperative position indicated by dotted lines 15, a bar 16 being projected through a suitable fitting 17 in the side wall of the housing 11 and having a handle 18 thereon whereby the screen 14 may be readily moved between operative and inoperative positions. The screen 14 defines the focal plane of the photographic apparatus 10, and when this screen 14 is in the position in which it is shown in full lines the lens element 12 may be adjusted to focus incoming light rays 20 so as to project an image on the screen 14. On a slide 21 mounted in the housing 11 a motor 22 is slidably mounted, and a projecting bar 23 provided with an external handle 24 may be employed to move the motor 22 along the slide 21. The motor 22 has a forwardly projecting shaft 25 which supports a scanner 26, this scanner being preferably of the disc type developed and employed in connection with television. In Fig. 1 the scanner 26 is shown in inoperative position in which it is removed from the focal plane defined by the screen 14. After the lens device or element 12 has been properly focused relative to the focal plane defined by the screen 14, which focusing of the lens element 12 may be observed through an opening 27 in the rear of the housing 11 equipped with a door 28, the screen 14 may be moved into an inoperative position, as indicated by the dotted lines 15, and the scanner 26 may then be moved rightwardly into operative position in the focal plane, which movement of the scanner 26 is accomplished by moving the motor 22 rightwardly along the slide 21. A light device 30 is so mounted within the housing 11 that it may be moved by means of a bar 31 in leftward direction from the position in which it is shown in full lines to the position indicated by dotted lines 32, wherein it will be in a position to receive the scanned light of the image projected onto the focal plane by the lens element 12.

The scanner driving motor 22 operates in synchronism with a record driving motor 33, and for the purpose of operating these motors 22 and 33 in a desired timed relationship I show them connected in parallel in an electric circuit 34 supplied with electric energy from a power source 35, there being switch means 36 for controlling the operation of the motors 22 and 33. The shaft 37 of the motor 33 carries a pulley 38 from which a belt 39 may be extended to a pulley 40 associated with a receiving spool 41. The shaft 37 also carries a wire feeding pulley 42. Ahead of the wire feeding pulley 42 a spool 43 is mounted on a shaft 44. From this spool 43 a wire 45 of magnetic characteristics is carried over guide means, such as indicated by a guide pulley 46, to the feed pulley 42. The wire 45 is then looped down over a secondary or idler pulley 47, as shown at 48, and is then continued over a guide pulley 50 to the receiving spool 41. The spool 43 may be frictionally retarded, and a rewind motor 52 may be provided whereby to rewind the wire 45 on the spool 43. The motor 52 may be also employed to exert a small frictional drag on the spool 43 in lieu of the provision of other means for preventing free rotation of the spool 43. The motors 22 and 33 are so linked in their operation that for each revolution of the scanner 26 a given amount of the record, or specifically the wire 45, will be moved forwardly by the feeding pulley 42, it being understood that the belt 39 exerts merely a frictional driving engagement with the receiving spool 41 and therefore serves only to keep the wire 45 taut. An electromagnetic element 54 is placed in such position relative to the wire 45 that projecting magnet cores 55 will lie adjacent to the wire so that the magnetic flux flowing between the members 55 will magnetize the wire 45.

The light device 30, which in the recording of a motion picture consists of a light responsive element such as a photoelectric cell, is connected with the electromagnetic element 54 by a current means 60 having the purpose of conducting a fluctuated electric current from the light device 30 to the electromagnetic element 54. In the illustration I show the current means as consisting of conductors 61, which extend from the light device 30 to an amplifier and power cabinet 62, and conductors 63 which extend to the electromagnetic element 54.

In the operation of the invention for the recording of a motion picture, the motion picture or photographic image is scanned by the scanner 26. The scanned light of the photographic image is received by the light device or photoelectric cell 30 and produces fluctuations in the current flowing through the conductors 61 in accordance with the fluctuations of the scanned light reaching the light device 30 through the openings of the scanner 26. An amplified, corresponding fluctuated current also flows through the conductors 63 and through the windings of the electromagnetic element 54, thus producing fluctuations in the magnetic flux which is flowing between the cores or pole pieces 55 of the electromagnetic element 54. The magnetization of the record or wire 45 is accordingly fluctuated in such a manner as to be representative of the current fluctuations in the current means 60 and of the fluctuations of the scanned light which is received by the light device 30. In the foregoing manner a continuous record of the light fluctuations of a scanned motion picture image is formed, and this record may be employed to project the motion picture thus recorded in the following manner:

In Fig. 2 I show the housing 11 and the scanner 26 in operative position therein, but the light device 30 consists of a means for producing a forwardly projecting light beam 65 fluctuated in accordance with the variations or fluctuations in the conductors 61 of the current means 60. The light beam 65 projected by the light device 30 is scanned by the scanner in a manner to project a motion picture image through the lens element 12 and onto a screen 66.

The projecting operation is carried on substantially as follows: The scanner 26 and the record 45 are motivated in synchronism by the use of the motors 22 and 33, thus synchronizing the fluctuations of the magnetic current in the record 45 with the movement of the apertures in the scanner 26. As the record or wire 45 moves through the electromagnetic element 54, the electric current flowing through and within the current means 60 will be fluctuated, and this fluctuation of the current in the current means 60 will produce a corresponding fluctuation in the strength of the light beam 65 issued by the light element 30 which is controlled by the current means 60, the result being that the scanning of the light beam 65 by the scanner 26 will produce a motion picture image on the screen 66, providing, of course, that the record 45 is synchronized with the scanner 26.

Although I have herein shown and described a simple and practical embodiment of my invention, it is recognized that certain parts and elements thereof are representative of other parts, elements, or mechanisms which may be employed in substantially the same manner to accomplish substantially the same results; therefore, it is to be understood that the invention is not to be limited to the details disclosed herein but shall have the scope of the following claims.

I claim as my invention:

1. A method of motion picture making which consists in: initially moving a screen into a position substantially centralized on a defined focal axis; casting an image on said screen; viewing said image cast on said screen to determine the focus thereof; moving said screen from said focal axis; moving a scanner into a position intersecting said focal axis to receive the focused image; moving a light device into an operative position on said focal axis; scanning said image; causing an electric current to fluctuate in accordance with the variation in light from the image; and forming a magnetic record representative of the fluctuations of said electric current.

2. A method of motion picture making which consists in: initially moving a screen into a position substantially centralized on a defined focal axis; casting an image on said screen to determine the focus thereof; moving said screen from said focal axis; moving a scanner into a position intersecting said focal axis to receive the focused image; scanning said image; moving a light device into an operative position on said focal axis; causing an electric current to fluctuate in accordance with the variation in light from the image; forming a magnetic record representative of the fluctuations of said electric current; fluctuating a second electric current in accordance with said record; employing said current to fluctuate a light; scanning said light; and forming an image of the light so scanned.

3. A method of recording a motion picture which consists in: moving a screen into a position substantially centralized on a defined focal axis; casting an image on said screen to determine the focus thereof; moving said screen from said focal axis; moving a scanner into a position intersecting said focal axis to receive the focused image; scanning said image; moving a light device into an operative position on said focal axis; causing an electric current to fluctuate in accordance with the variation in light from the image; and forming a record representative of the fluctuations of said electric current.

4. A method of recording a motion picture which consists in: moving a screen into a position substantially centralized on a defined focal axis; casting an image on said screen to determine the focus thereof; moving said screen from said focal axis; moving a scanner into a position intersecting said focal axis to receive the focused image; scanning said image; moving a light responsive element into an operative position on said focal axis; causing an electric current to fluctuate in accordance with the variation in light from the image; and forming a record representative of the fluctuations of said electric current.

5. A method of motion picture making which consists in: moving a screen into a position centralized on a defined focal axis; casting an image on said screen to determine the focus thereof; moving said screen from said focal axis; moving a scanner into a position intersecting said focal axis to receive the focused image; scanning said image; moving a photoelectric device into an operative position on said focal axis; causing an electric current to fluctuate in accordance with the variation in light from the image; forming a record representative of the fluctuations of said electric current; fluctuating a second electric current in accordance with said magnetic record; employing said current to fluctuate a light; scanning said light; and forming an image of the light so scanned.

6. A method of motion picture making which consists in the steps of: moving a screen into a position substantially centralized on a defined focal plane; casting an image on said screen to determine the focus thereof; moving said screen from said focal axis; moving a scanner into a position intersecting said focal axis to receive the focused image; scanning said image; moving a light responsive element into an operative position on said focal axis; causing an electric current to fluctuate in accordance with the variation in light from the image; forming a record representative of the fluctuations of said electric current; and projecting the image by a reversal of said recording steps.

7. A method of motion picture making which consists in the steps of: initially moving a screen into a position substantially centralized on a defined focal axis; casting an image on said screen to determine the focus thereof; moving said screen from said focal axis; moving a scanner into a position intersecting said focal axis to receive the focused image; moving a light responsive device into a position on said focal axis; rotating said scanner for scanning said image; moving a magnetic wire in timed relationship to said scanner; placing an electromagnetic element in a position to be traversed by said wire; passing an electric current through said electromagnetic element; and causing said light responsive device to fluctuate said electric current in accordance with the variation of the light from said image.

In testimony whereof, I have hereunto set my hand at Los Angeles, California, this 12th day of March, 1930.

VINCENT C. DE YBARRONDO.